Patented Jan. 5, 1937

2,066,542

UNITED STATES PATENT OFFICE 2,066,542

HETEROPOLAR COMPOUNDS AND METHOD OF PRODUCING THE SAME

Walther Schrauth, Berlin-Dahlem, Germany, assignor to Deutsche Hydrierwerke Aktiengesellschaft, Berlin-Charlottenburg, Germany, a corporation of Germany No Drawing. Application June 14, 1934, Serial No. 730,680. In Germany June 15, 1933

14 Claims. (Cl. 260—99.12)

This invention relates to heteropolar compounds and more particularly refers to heteropolar compounds which are especially adapted for use as wetting, detergent and emulsifying agents, and processes for their manufacture.

Heretofore polyhydroxy compounds have been reacted with agents which increase their solubility and which render the resulting products readily emulsifiable. Since the agents which accomplish the aforementioned purposes are usually dissimilar it is advisable that a polyhydroxy alcohol have substituted thereon at least one agent which increases the solubility and at least one agent which increases the emulsifying properties of the resulting compound. However, this object was not attained due to the fact that substitution of a given component was liable to take place on several hydroxy groups of the polyhydroxy compound. This occurrence resulted in the production of non-heteropolar compounds which had unsatisfactory wetting, detergent and emulsifying properties.

It is an object of this invention to produce new heteropolar compounds. A further object is to produce compounds which are surprisingly well adapted for use as wetting, detergent and emulsifying agents. A still further object is to produce these compounds in a simple and efficient manner. A still further object is to selectively introduce the group which imparts water solubility to the resulting compound. A still further object is to selectively introduce the group which imparts fat-solubility and emulsifiable properties to the resulting compound. Additional objects will become apparent from a consideration of the following description and claims.

These objects are attained according to the herein described invention which comprises reacting a halogen substituted aliphatic alcohol with an agent which imparts water-solubility to the resulting compound or which imparts fat-solubility or emulsifiable properties to said compound, the resulting product being reacted with a dissimilar member of the aforementioned class. In a more limited sense the invention comprises reacting a hydrocarbon having more than four carbon atoms, at one extremity of which is substituted a halogen group and at the other extremity of which is substituted a hydroxyl group, with an agent which imparts water-solubility or emulsifying properties to the resulting compound and reacting the product with a dissimilar member of the aforesaid class. In its preferred embodiment the invention pertains to the reaction of normal primary alcohols having more than four carbon atoms and having a chloro group substituted on the opposite extremity from the hydroxyl group with a sulfonating agent or equivalent solubilizing agent, and reacting the product with a fatty acid or equivalent emulsifying agent.

The invention may be more readily understood by a consideration of the following illustrative examples:

Example 1

1 part of 1,6-hexandiol is added to 5–6 parts of 25% hydrochloric acid. The mixture is heated to from 70–80° C. for 5 hours, while being stirred. The chlorinated product is then treated in an autoclave with an aqueous sodium sulfite solution at 160–180° C. The product is probably the sodium salt of 6-hydroxy-hexan-1-sulfonic acid. This product is then esterified with a fatty acid such as caproic or caprylic acid. The resulting compound possessed valuable emulsifying, detergent and dispersing properties.

By substituting higher fatty acids for the caproic or caprylic acid referred to in Example 1 additional compounds which are particularly well adapted for use as dispersing and emulsifying agents are produced. The acids which may be used for this purpose are capric, lauric, myristic, palmitic, oleic, ricinoleic, stearic and linoleic.

Example 2

200 parts by weight of 10-chlordecanol-1 are treated in an autoclave at 140° C. with 400 parts by weight of ethylene-oxide and 4 parts by weight of concentrated sulfuric acid. This treatment is continued until the decrease in pressure indicates that the ethylene-oxide has been consumed. The resulting product is probably the polyglycol ether of chlordecanol. It is heated with sodium salts of fatty acids, thereby resulting in the production of fatty acid esters of the hydroxy-decyl-polyglycol ether. These products are valuable detergents when the fatty acids used are of lower molecular weight. When higher molecular weight fatty acids are used the products have very satisfactory emulsification properties.

It is to be understood that the aforementioned examples are illustrative merely of the methods of practicing the present invention. In place of the alcohols therein referred to numerous other polyhydroxy compounds might be substituted. These compounds preferably have two hydroxyl groups situated at either extremity of the hydrocarbon chain. However, the invention is not limited thereto since hydroxy groups of secondary and/or tertiary character might be substituted in place of the aforementioned primary hydroxy groups or in addition thereto. While the hydrocarbon radical of these polyhydric alcohols is preferably a saturated normal aliphatic hydrocarbon the invention is not restricted thereto as unsaturated hydrocarbons or hydrocarbons having side chains or other substituents attached thereto might also be used. Where the hydrocarbon is unsaturated it is possible to attack the unsaturated linkage and substitute thereon additional groups which further vary the properties of the products, either by increasing its solubility in water or its emulsifying or dispersing properties.

In order to obtain the heteropolar compounds herein described one of the hydroxyl groups, which preferably is situated at one extremity of the hydrocarbon chain is substituted by a halogen group. This substitution may advantageously be effected by treatment with hydrochloric acid although the invention is not limited to this particular type of halogenation treatment.

After halogenation of the polyhydric alcohol or analogous compounds which result in the production of similar halogenated alcoholic derivatives, the product is treated with an agent which renders the resulting compound more soluble in water or increases its fat-solubility or its emulsifiable properties. Agents which accomplish the aforementioned purposes are well known and need not be described in detail herein. However, a few representative compounds selected from this class are: in the case of groups which impart water-solubility—the sulfonic acid group, the sulfuric acid ester group, ester groups of polybasic aliphatic or aromatic acids, glycol, polyglycol, glycerin, polyglycerin, residues with an appreciable oxygen content, amino derivatives and in particular those amino derivatives neutralized by acids, residues of aromatic sulfo acids, etc.—in the case of agents which impart fat-solubility and emulsifiable properties—fatty acids, particularly those acids which contain from six to eighteen carbon atoms, fatty alcohols corresponding in number of carbon atoms with the aforementioned acids, and sulfonated derivatives of said acids, and alcohols. Examples of the fatty alcohols referred to are capryl, octyl, decyl, lauryl, myristyl, cetyl, stearyl, oleyl, ricinoleyl and linoleyl. The unsaturated acids and/or alcohols are particularly adapted for further substitution in accordance with the present invention. By substituting thereon true sulfonate and/or sulfate groups the water-solubility of the resulting compound is further enhanced.

It is to be understood that the halogenated alcohol may first be treated with an agent which imparts water-soluble properties to the resulting compound or with an agent which increases the fat-solubility and the emulsifiable properties of said compound. The product thereof may then be treated with a dissimilar member of the same class or a member of the remaining class.

The products produced according to this invention are exceptionally satisfactory for use as wetting, detergent and emulsifying agents. They may be used in place of or in admixture with well-known soap or soap substitutes. Likewise, they may be used with the usual detergent, wetting-out and emulsifying assistants such as phosphates, alkaline substances, etc. When products of relatively high molecular weight are obtained, they are in general not as satisfactory for detergent purposes as similar products of lower molecular weight. However, these products are well suited for use as lubricating, emulsifying and dispersing agents in the leather and textile industry. They are also of value in the production of stable emulsified fat preparations.

As many apparently widely different embodiments of this invention may be made without departing from the spirit and scope thereof, it is to be understood that the invention is not limited to the specific embodiments thereof except as defined in the appended claims.

What I claim is:—

1. A process for producing heteropolar compounds which comprises reacting an open chain aliphatic halogenated alcohol with a member selected from the class consisting of agents which render the resulting compound water-soluble and agents which render the resulting compound fat-soluble, then reacting the resulting product with a dissimilar member of the aforesaid class.

2. A process for producing heteropolar compounds which comprises reacting a straight chain halogenated alcohol with an agent which renders the resulting compound water-soluble, then reacting said compound with an agent which renders the resulting compound fat-soluble.

3. A process for producing heteropolar compounds which comprises reacting an open chain aliphatic halogenated monohydric primary alcohol with a member selected from the class consisting of agents which render the resulting compound water-soluble and agents which render the resulting compound fat-soluble, then reacting the resulting product with a dissimilar member of the aforesaid class.

4. A process for producing heteropolar compounds which comprises reacting a straight chain halogenated monohydric primary alcohol with an agent which renders the resulting compound water-soluble, then reacting the resulting product with an agent which renders the resulting compound fat-soluble.

5. A process for producing heteropolar compounds which comprises reacting a straight chain chlorinated monohydric primary alcohol with a member selected from the class consisting of agents which render the resulting compound water-soluble and agents which render the resulting compound fat-soluble, then reacting the resulting product with a dissimilar member of the aforesaid class.

6. A process for producing heteropolar compounds which comprises reacting a straight chain chlorinated monohydric primary alcohol with an agent which renders the resulting compound water-soluble, then reacting the resulting product with an agent which renders the resulting compound fat-soluble.

7. A process for producing heteropolar compounds which comprises reacting a compound having the following general formula:

$$X-R-OH$$

wherein X represents a halogen atom and R represents a straight chain hydrocarbon radical containing at least four carbon atoms, with a member selected from the class consisting of compounds of low molecular weight containing sulfate, sulfonate, carboxyl, hydroxyl or amino-groups, the latter neutralized by acids, then reacting the resulting product with a member selected from the class consisting of fatty acids, fatty alcohols and sulfonated derivatives of said acids and alcohols containing at least six carbon atoms.

8. A process for producing heteropolar compounds which comprises reacting a compound having the following general formula:

$$Cl-R-OH$$

wherein R represents a straight chain hydrocarbon radical containing at least 4 carbon atoms, with a member selected from the class consisting of compounds of low molecular weight containing sulfate, sulfonate, carboxyl, hydroxyl or amino groups, the latter neutralized by acids then reacting the resulting product with a member selected from the class consisting of fatty acids, fatty alcohols and sulfonated derivatives of said acids and alcohols containing at least 6 carbon atoms.

9. Heteropolar compounds having the following general formula:

$$X-R-OOCR'$$

wherein X represents a water-solubilizing group, R represents a straight chain alkylene radical of at least 4 carbon atoms, and R' represents a hydrocarbon radical, and wherein the groups represented by X— and —OOCR' are substituted on opposite extremities of the alkylene radical.

10. Heteropolar compounds having the following general formula:

$$X-R-OOCR'$$

wherein X represents a water-solubilizing group, R represents a straight chain alkylene radical of at least 4 carbon atoms, and R' represents a straight chain hydrocarbon radical of at least 5 carbon atoms, and wherein the groups represented by X— and —OOCR' are substituted on opposite extremities of the alkylene radical.

11. Heteropolar compounds having the following general formula in the form of their free acids:

$$HO_3S-R-OOCR'$$

wherein R represents a straight chain alkylene radical of at least 4 carbon atoms, and R' represents a straight chain hydrocarbon radical of at least 5 carbon atoms, and wherein the sulfonic acid group and the group represented by —OOCR' are substituted on opposite extremities of the alkylene radical.

12. Heteropolar compounds having the following general formula in the form of their free acids:

$$HO(CH_2CH_2O-)_n R-OOCR'$$

wherein R represents a straight chain alkylene radical of at least 4 carbon atoms $n$ represents an integer greater than 3, and R' represents a straight chain hydrocarbon radical of at least 5 carbon atoms, and wherein the ethenoxy group and the group represented by —OOCR' are substituted on opposite extremities of the alkylene radical.

13. A heteropolar compound having the following formula in the form of its free acid:

$$C_7H_{15}COO-C_6H_{12}-SO_3H$$

the caprylic and sulfonic acid groups being substituted on opposite extremities of the alkylene radical.

14. A process for producing heteropolar compounds which comprises reacting 1,6-hexandiol with hydrochloric acid, treating the product with an aqueous solution of sodium sulfite at elevated temperatures, then esterifying the resulting product with caprylic acid.

WALTHER SCHRAUTH.